US012466034B2

(12) United States Patent
Roberts

(10) Patent No.: US 12,466,034 B2
(45) Date of Patent: Nov. 11, 2025

(54) MULTI-STATION VISE ADAPTER

(71) Applicant: Geordan Roberts, Bixby, OK (US)

(72) Inventor: Geordan Roberts, Bixby, OK (US)

( * ) Notice: Subject to any disclaimer, the term of this patent is extended or adjusted under 35 U.S.C. 154(b) by 275 days.

(21) Appl. No.: 17/967,475

(22) Filed: Oct. 17, 2022

(65) Prior Publication Data

US 2024/0123576 A1 Apr. 18, 2024

(51) Int. Cl.
*B25B 1/24* (2006.01)

(52) U.S. Cl.
CPC .................................. *B25B 1/2405* (2013.01)

(58) Field of Classification Search
CPC .... B25B 1/2405; B25B 1/2452; B25B 1/2478
See application file for complete search history.

(56) References Cited

U.S. PATENT DOCUMENTS 6,062,553 A * 5/2000 Strehl .................. B25B 1/2452 269/282
6,196,536 B1 * 3/2001 Hintze ................. B25B 1/2405 269/282
6,971,643 B1 * 12/2005 Garrison ............... B25B 1/2405 269/282
10,179,392 B2 * 1/2019 Taylor .................. B25B 1/2478
2012/0205852 A1 * 8/2012 Coleman ............... B25B 1/2478 269/278
2022/0388124 A1 * 12/2022 Ramirez .................. B25B 1/02

* cited by examiner

*Primary Examiner* — Seahee Hong

(74) *Attorney, Agent, or Firm* — Wayne Edward Ramage; Baker Donelson

(57) ABSTRACT

An improved vise adapter for use with existing industrial single stage vises. A rear fixed jaw adapter block is mounted on the rear fixed jaw of the vise, a front floating jaw adapter block is mounted on the front floating jaw of the vise, and a middle floating jaw is slidingly mounted therebetween on two pairs of guide shafts extending out from the rear fixed jaw adapter block. The front floating jaw adapter block also is slidingly mounted on the guide shafts. As a linear clamping force is applied in the direction of the fixed jaw of the vise, the adapter holds two workpieces instead of a single workpiece.

15 Claims, 5 Drawing Sheets

MULTI-STATION VISE ADAPTER

FIELD OF INVENTION

The present invention relates to the field of industrial workholding devices. More specifically, the invention relates to a workholding accessory for attachment to existing commercially-available industrial workholding vises to enhance functionality and productivity.

BACKGROUND OF THE INVENTION

In a variety of manufacturing processes, it is necessary to precisely locate and clamp a workpiece so that an operation can be performed on the workpiece in order to prepare it for subsequent processes or to produce a final product. Processes which require location and restraint of a workpiece cover a wide range of applications, including, but not limited to, reductive manufacturing techniques such as machining, cutting, grinding, broaching, and other similar processes. Equipment utilized to perform this type of location and clamping are commonly referred to as workholding equipment. The majority of manufacturing processes requiring workholding equipment are very established, which has led to a large number of standardized workholding apparatus which are ubiquitous in their respective industries.

As an example, most machine shops, regardless of size, utilize single station workholding vises that are mounted onto a machining center "mill" table for workpiece holding. These single station vises come in various standard widths and clamp travel distances to accommodate workpieces of different sizes. The individual vises are expensive, so reduction in the total number of vises required for a shop to operate is advantageous. Most machine shops desire to have multiple pieces of equipment running simultaneously so it is necessary for each piece of equipment to have associated workholding equipment. Part of the difficulty in minimizing the total number of vises a shop must have on hand is that mounting of these vises to equipment table requires significant time and effort by a skilled technician to ensure proper fixturing and alignment. This results in lost productivity for the process. Combined with the need for various standard sized vises to accommodate varied sizes of workpieces, as well as the need for spare sets of workholding equipment in case of damage to primary units, this results in a shop having to make a significant investment in workholding equipment to maintain optimal runtime efficiency.

Options for improvements over single station vises are available. For example, most commercial manufacturers of workholding equipment offer dual station vises which provide for location and clamping of multiple workpieces within a single piece of process equipment at one time. This increases process efficiency by allowing multiple parts or operations to be completed sequentially with reduced operator interaction. Specifically, in the case of computer numerical control machine operations, this allows an operator to load workpieces once, to create multiple parts, thereby allowing greater flexibility to perform other tasks or operate additional machines while the automated process is taking place. While dual station vises do offer distinct advantages over single station vises, the disadvantages of this type of workholding equipment include the following: significantly higher cost-of-entry; increased set-up time; decreased usable machine envelope due to increased size of workholding equipment; reduced accuracy and rigidity when only holding a single workpiece; and reduced ease of handling and storage due to physical size and weight.

Custom inserts can be used to improve the functionality of single station vises. For example, when it is desired to locate and clamp multiple smaller workpieces within a single station vise, custom inserts may be fabricated that attach to the clamping surfaces of the vise (i.e., the "jaws" of the vise). These jaw inserts must have pockets machined into the faces of the inserts in an array parallel to the jaws of the vise that match the size and shape of the workpieces to be held. The major disadvantage of using this apparatus is the irregularity of clamping forces on each individual workpiece. No matter the type of workpiece material and/or degree of care executed in processing, there will always be dimensional differences in the workpieces, and the jaw inserts can only exert maximum clamping pressure against the largest workpiece in the array. The irregularity of clamping forces reduces process accuracy and creates greater risk of part defects. Furthermore, these jaw inserts typically are fabricated out of materials which are easy to machine so that the custom pockets can be created to clamp workpieces (these inserts thus are usually referred to as "Soft Jaws"), which causes them to be prone to accelerated and increased wear, thus requiring frequent replacement.

Additionally, attachment apparatus to improve the functionality of single station vises similar to the that of dual station vises is commercially available. An example of this uses an adjustable framework that mounts to a standard vise behind the jaw inserts. The framework provides attachment means for a center "floating" jaw via sliding linear rails that allow for movement in between the front and rear jaws of the vise. Jaw inserts are also attached to the center floating jaw, which creates two separate clamping positions both in front of and behind the center floating jaw that can be utilized by engaging the clamping axis of the single station vise. In some configurations, these attachments include spring loaded adjustable stops to aid in release of the rear station when unclamping the workpieces.

Accordingly, what is needed is an improved workholding accessory for attachment to existing industrial workholding vises to enhance functionality and productivity.

SUMMARY OF INVENTION

In various embodiments, the present invention comprises an apparatus for use with existing industrial workholding devices. Mounting provisions on the apparatus do not act solely as a mounting interface between the vise and the jaw inserts, but replace the jaw inserts. Removing the requirement for additional jaw inserts (each of which may be up to two inches thick) frees up usable space to clamp larger parts within a given vise clamp travel distance. Additionally, mounting provisions are included for adding gripper teeth to the top edge of the adapter jaws, which eliminate the need for most custom machined soft jaw inserts. If a workpiece still requires use of soft jaw inserts, however, the soft jaw inserts may still be utilized with the present invention.

Setting up the present invention for operational use with the use of standardized spacers and a captive spring is simplified over pre-existing vise attachments. In prior systems, four adjustable stops must be set manually by "feel" in order for those devices to properly function. The present invention utilizes a spacer tool that is inserted by an operator into the apparatus during the set-up, with a single adjustable stop on each side of the vise attachment to hold location. The spacer tools are used to preload the spring during set-up by clamping the workpieces then tightening set screws on the stop collars housed inside a pocket on the center floating jaw. Once the clamping force is removed from the vise, the spacer tools can be removed and the preloaded compression springs will restrict overall travel distance to ensure repeatable use.

In additional embodiments, the jaws of the present invention extend outside of the envelope of the single station workholding vise to which the adapter is mounted. Existing commercial vises typically start at a four-inch width and step up in two inch increments. By extending the over-all width of the jaws on the adapter of the present invention, it offers the clamping width and/or area of the next-size-up vise from the vise on which the adapter is installed, thereby further reducing the overall number of workholding vises a shop needs to efficiently operate.

Further, the present invention reduces the overall complexity of prior art designs, and increases the use of standardized parts. The design configuration of the present invention uses approximately 85% commercial-off-the-shelf components for reduced cost, ease of fabrication, and improved repair and maintenance.

DETAILED DESCRIPTION OF EXEMPLARY EMBODIMENTS

In various embodiments, the present invention comprises an improved vise adapter apparatus and related processes for installation and use for use with existing industrial workholding devices. Mounting provisions on the apparatus do not act solely as a mounting interface between the vise and the jaw inserts, but replace the jaw inserts. Removing the requirement for additional jaw inserts (each of which may be up to two inches thick) frees up usable space to clamp larger parts within a given vise clamp travel distance. Additionally, mounting provisions are included for adding gripper teeth to the top edge of the adapter jaws, which eliminate the need for most custom machined soft jaw inserts. If a workpiece still requires use of soft jaw inserts, however, the soft jaw inserts may still be utilized with the present invention.

Figure 1:
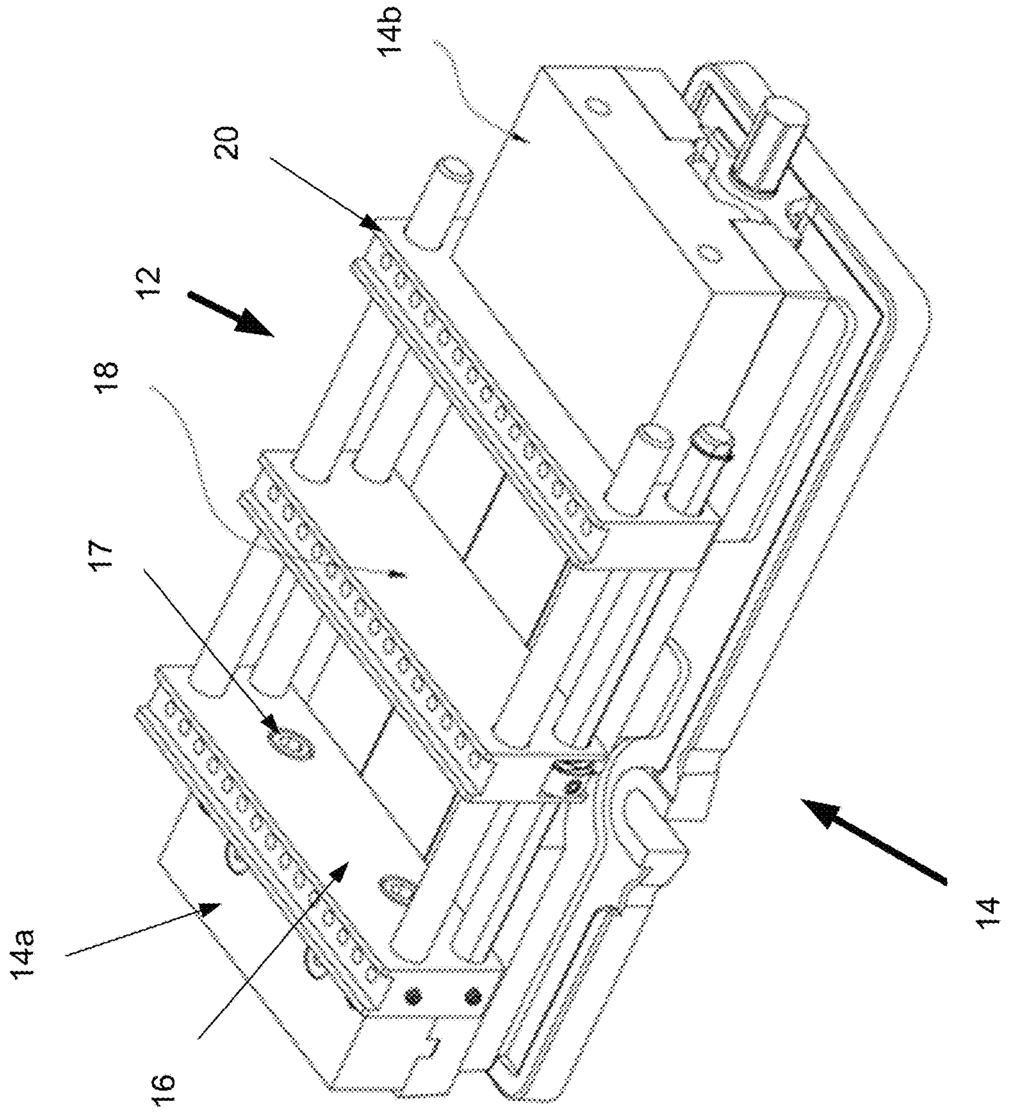
FIG. 1 shows an isometric profile view depicting the multi-station vise adapter mounted onto a commercial single station vise.

As seen in FIG. 1, the multi-station vise adapter 12 is mounted onto or into a single station vise 14. The single station vise 14 is the standard, commercial-grade single station vise typically used for locating and fixing (i.e., clamping and/or holding) of workpieces during machining or other manufacturing operations. The adapter 12 of the present invention is mounted on the single station vise between the vise jaws 14*a, b* using existing standard fastening means and methods, and requires no modification to the single station vice components, while allowing for the clamping of multiple workpieces by the single station vise 14.

Figure 2:
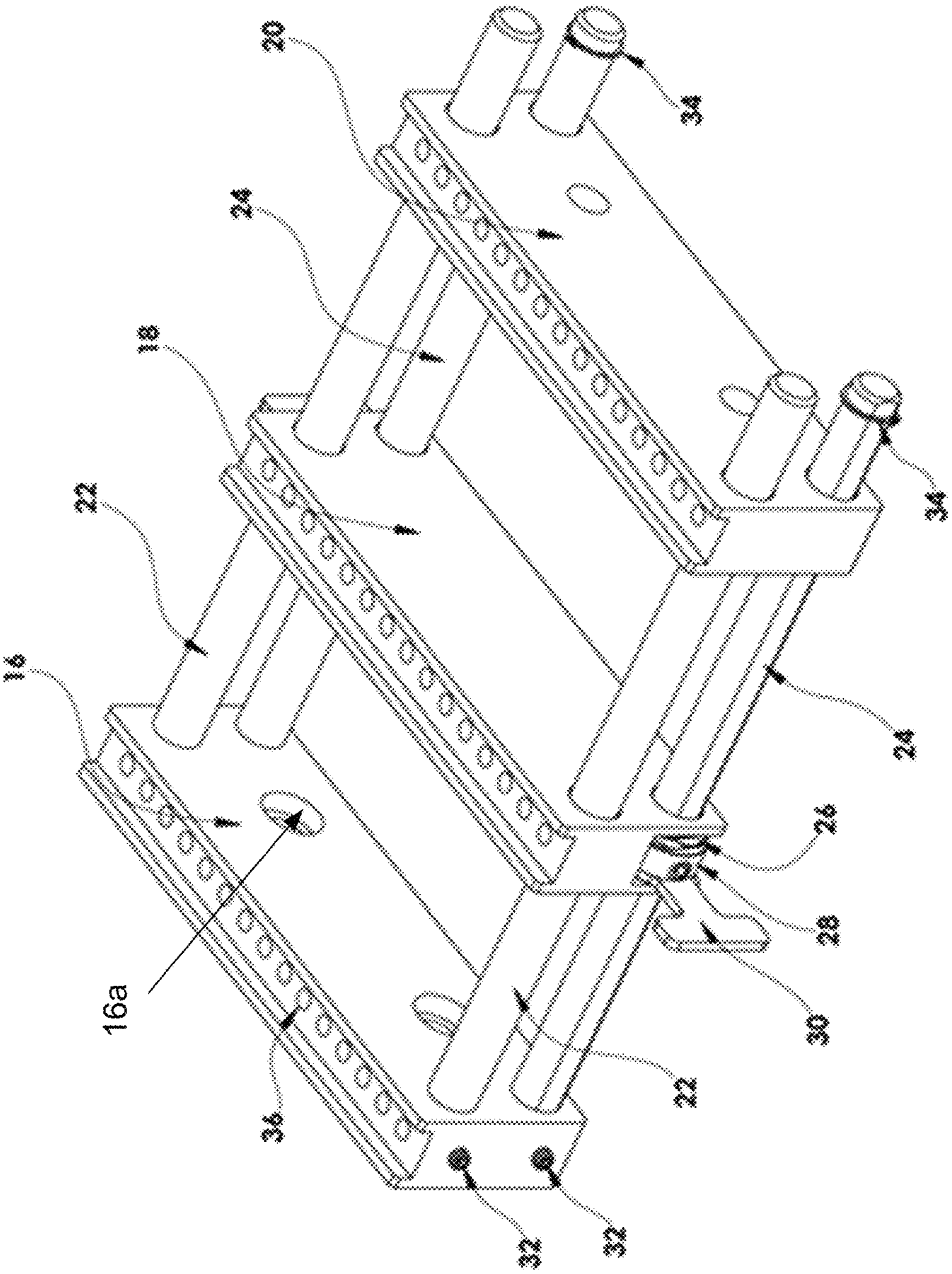
FIG. 2 shows an isometric profile view of the multi-station vise adapter of FIG. 1.
Figure 3:
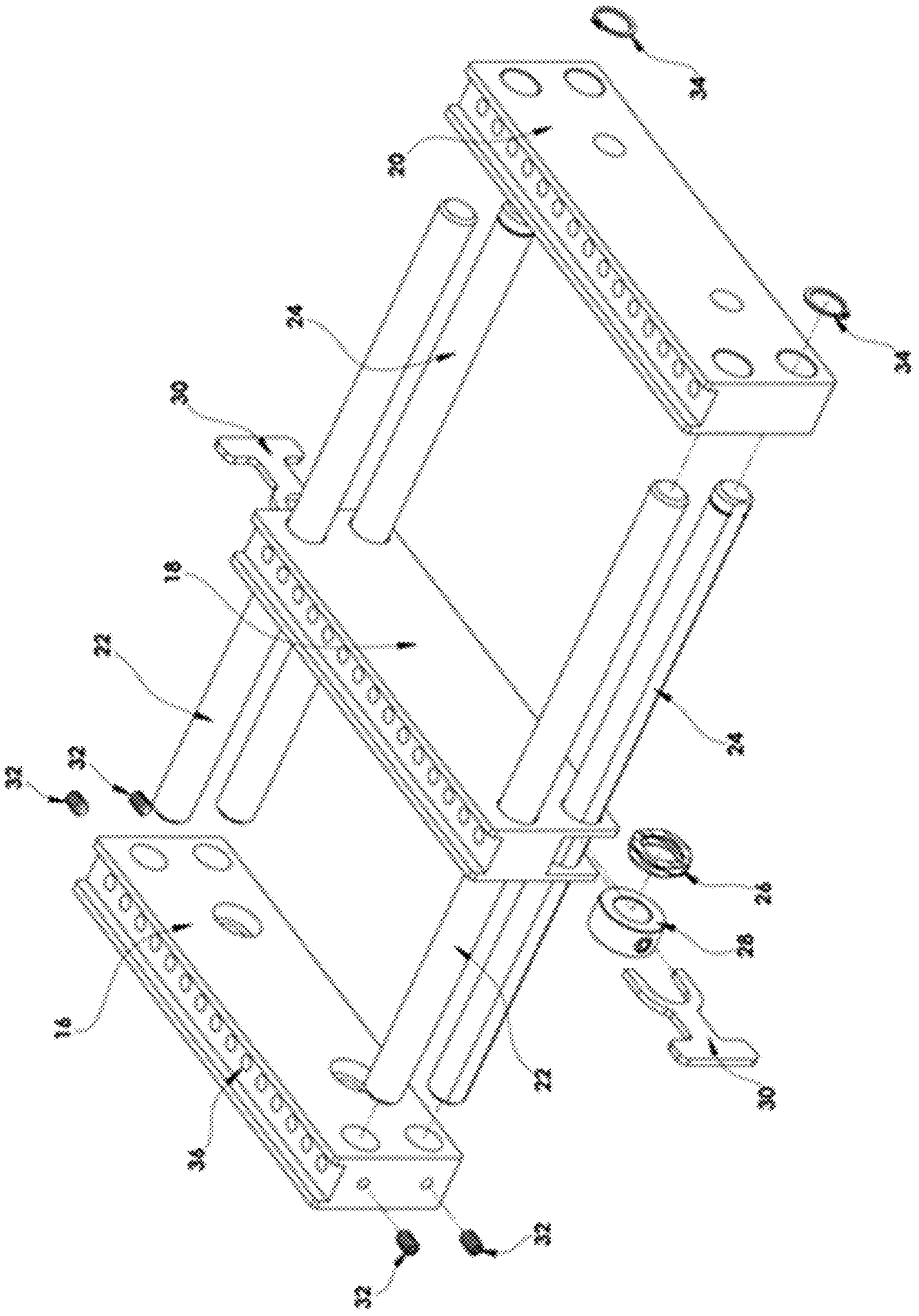
FIG. 3 shows an exploded view of the components of the multi-station vise adapter of FIG. 2.

FIGS. 2 and 3 show the adapter 12 with components identified. The rear fixed jaw adapter block 16 of the multi-station vise adapter 12 is mounted to the rear fixed jaw 14*a* of a commercial single station vise 14 by fasteners 17 inserted through mounting holes 16*a*. The front floating jaw adapter block 20 is used to similarly mount (using mounting holes 20*a*) the adapter 12 to the front floating jaw 14*b* of the single station vice 14. The middle floating jaw 18 provides the bearing surfaces for workpiece holding between the rear fixed jaw adapter block 16 and front floating jaw adapter block 20 when clamping force is applied to the single station vise 14.

Two circular guide shafts 22 are fixedly attached in parallel to the rear fixed jaw adapter block 16 by use of set screws 32, and allow for free sliding movement of the middle floating jaw 18 and front floating jaw adapter block 20 along the guide shafts' linear axis. Two D-profile guide shafts 24 are fixedly attached to the rear fixed jaw adapter block 16 below and parallel to the respective circular guide shafts 22 by use of set screws 32, and similarly allow for free sliding movement of the middle floating jaw 18 and front floating jaw adapter block 20 along their linear axis. The guide shafts pass through corresponding holes or openings in the middle floating jaw 18 and front floating jaw adapter block 20.

The flattened face on the D-profile guide shafts 24 provide a bearing surface to clamp the shaft collars 28 in place during set-up and use of the adapter 12. Compression springs 26 are fitted around the D-profile guide shafts 24. Wave disc, stacked Belleville washers, spring wire, or other forms of compression springs may be used for this purpose. The compression springs 26 are located adjacent to the shaft collars 28 to provide a release force to the middle floating jaw 18 when clamping force is removed from the single station vice 14. The shaft collars 28 (one on each D-profile guide shaft) provide an adjustable backstop for the compression springs 26.

The set screw 29 on each shaft collar 28 is torqued into the flat face of the D-profile guide shafts 24 during set-up to restrict the movement of the middle floating jaw 18 based upon the overall travel of the compression springs 26 and the width of the workpieces being clamped. During the set-up process, a spacer tool 30 (one for each D-profile shaft guide) is placed or inserted in front of the corresponding shaft collar 28 to simulate an appropriate pre-load of the compression springs 26 while clamping against the workpieces. During use of the adapter 12, the spacer tools 30 are removed, and the single station vice 14 is clamped against the workpiece (s) as normal.

Four set screws 32 (one per shaft) are used to fix the corresponding circular guide shafts 22 and D-profile guide shafts 24 to the rear fixed jaw adapter block 16. Retaining rings 34 (one per shaft) are attached to either the circular guide shafts 22 or D-profile guide shafts 24 in a ring groove on the respective shaft. The retaining rings limit the travel of the front floating jaw adapter block 20 and keep the multi-station vise adapter 12 assembly together when not attached to a single station vise 14.

Threaded mounting holes 36 are included on the top edge of the rear fixed jaw adapter block 16, the middle floating jaw 18, and the front floating jaw adapter 20. The threaded mounting holes provide attachment points for vise jaw accessories, as described below.

Figure 4:
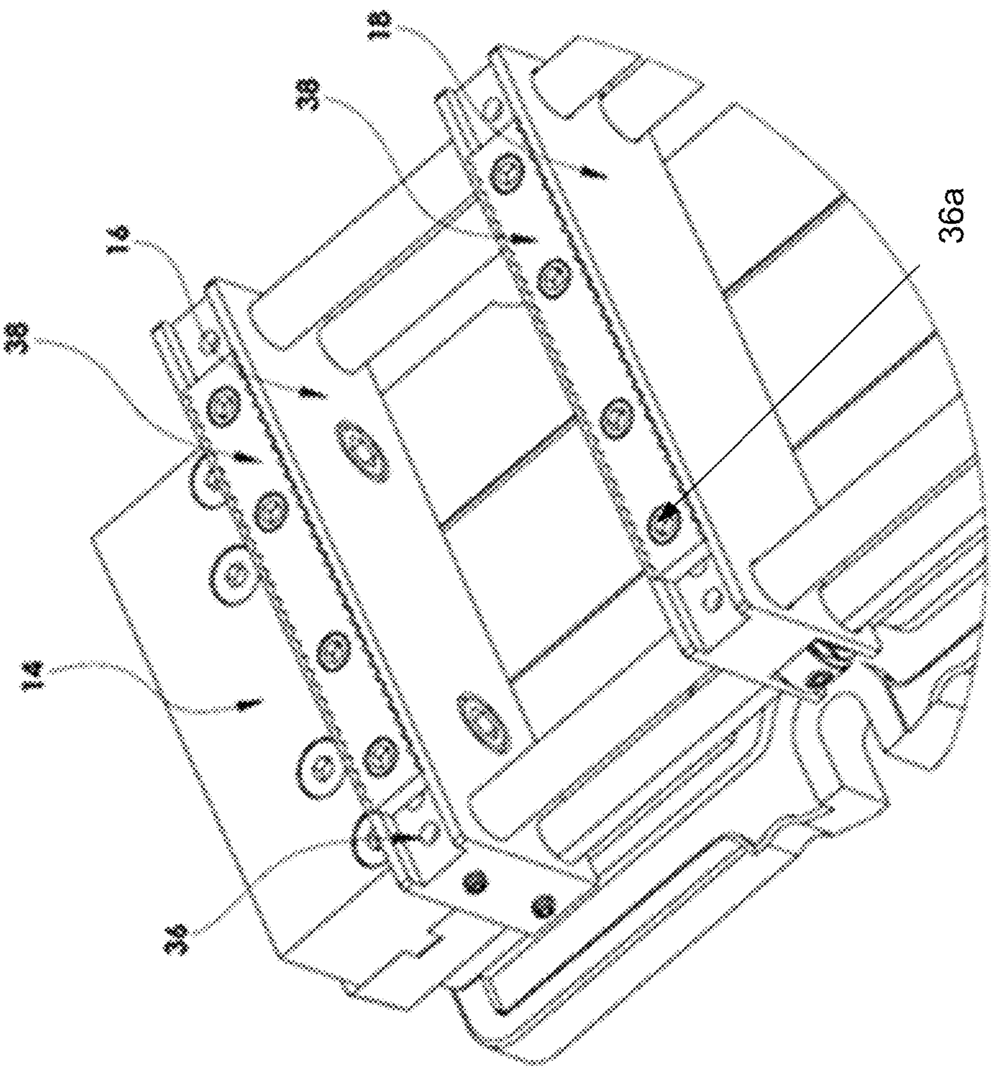
FIG. 4 shows a detail profile view depicting vise jaw accessories installed onto the multi-station vise adapter while mounted onto the commercial single station vise of FIG. 1.

As seen in FIG. 4, vise jaw accessories 38 may be installed onto the various component blocks 16, 18, 20 of the multi-station vise adapter 12 while mounted in a single station vise 14. Vise jaw accessories include, but are not limited to, machinable soft jaws, grip teeth, and the like. These accessories 38 may be attached to the rear fixed jaw adapter block, the middle floating jaw 18, and/or the front floating jaw adapter block by inserting corresponding fasteners 36*a* through the accessory and into the threaded mounting holes 36 in the respective component block. In the configuration shown in FIG. 4, the accessories 38 are gripper strips are fastened with standard bolts 36*a*.

Figure 5:
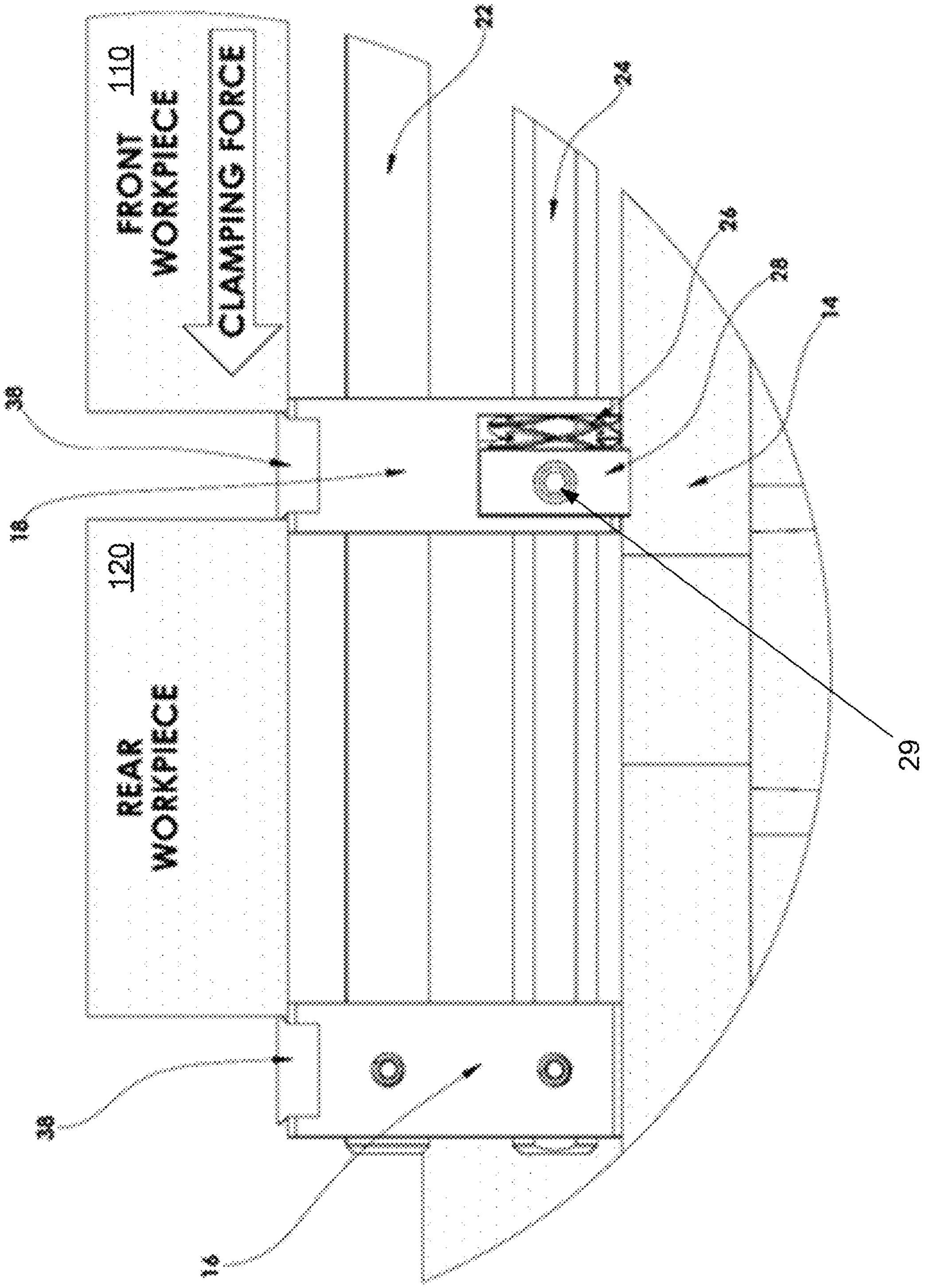
FIG. 5 shows a detail side view depicting workpiece clamping of the multi-station vise adapter while mounted onto the commercial single station vise of FIG. 1.

FIG. 5 shows a side view of the adapter 12 in use. Vice jaw accessories 38 in the form of gripper strips are attached to the rear fixed jaw adapter block 16, the middle floating jaw 18, and the front floating adapter block 20 (not shown in this figure). When clamping force is applied to the single station vice 14, the front workpiece 110 is moved by the front floating adapter block and respective gripper strip until it comes into contact with the middle floating jaw 18 and respective gripper strip 38. Continued application of the clamping force causes the middle floating jaw 18 travel linearly along the linear axis of the circular guide shafts 22 and D-profile guide shafts 24 until the clamping force is transferred to the rear workpiece 120 acting against the rear fixed jaw adapter block 16 and corresponding gripper strip 38. The shaft collars 28 are then locked in place during set-up, which allows transfer of clamping force into the compression springs 26 which are constrained within a pocket of the middle floating jaw 18. This then provides a load on the springs 26, which acts to return the multi-station vise adapter 12 to an open position when the clamping force is removed.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. An adapter for a single station vise, comprising:

a rear fixed jaw adapter block, configured to be mounted on a rear fixed jaw of a single station vise;

a pair of parallel circular guide shafts extending from the rear fixed jaw adapter block, each with a first end and a second end and a length therebetween, wherein the circular guide shafts are fixedly attached at or proximate to their respective first ends to the rear fixed jaw adapter block;

a pair of parallel D-profile guide shafts extending from the rear fixed jaw adapter block, each with a first end and a second end and a length therebetween, wherein the D-profile guide shafts are fixedly attached at or proximate to their respective first ends to the rear fixed jaw adapter block;

a front floating jaw adapter block, slidingly mounted on the pair of parallel circular guide shafts and the pair of parallel D-profile guide shafts, and configured to be mounted on a front floating jaw of the single station vise;

a middle floating jaw slidingly mounted on the pair of parallel circular guide shafts and the pair of parallel D-profile guide shafts, between the rear fixed jaw adapter block and the front floating jaw adapter block, said middle floating jaw comprising four holes, each hole configured to slidingly receive a corresponding circular guide shaft or a corresponding D-profile guide shaft, and further comprising two shaft collars and two springs, each shaft collar and spring slidingly mounted adjacent to each other on the corresponding D-profile guide shaft in a corresponding pocket in the middle floating jaw, each shaft collar being accessible from outside the middle floating jaw;

wherein the middle floating jaw is configured to be temporarily locked in a set position on the pair of parallel D-profile guide shafts.

2. The adapter of claim 1, wherein the front floating jaw adapter block comprises four holes, each hole configured to slidingly receive the corresponding circular guide shaft or the corresponding D-profile guide shaft from said pair of parallel circular guide shafts and said pair of parallel D-profile guide shafts.

3. The adapter of claim 1, wherein each spring is a compression spring, wave disc, stacked Belleville washer, spring wire, or combinations thereof.

4. The adapter of claim 1, wherein each shaft collar is configured to be temporarily locked in a set position on the corresponding parallel D-profile guide shaft.

5. The adapter of claim 4, wherein each shaft collar comprises a set screw.

6. The adapter of claim 4, wherein each spring is located between the corresponding shaft collar and the second end of the corresponding guide shaft.

7. The adapter of claim 6, wherein the springs are configured to absorb a linear clamping force applied in the direction of the rear fixed jaw adapter block when the corresponding shaft collars are locked into place, and push the adapter to an open position when the linear clamping force is removed.

8. The adapter of claim 1, wherein the middle floating jaw comprises a front face, a back face, a top side, a right side, a left side, and a bottom side, and the four holes extend from the front face to the back face, with an interior wall therebetween.

9. The adapter of claim 8, wherein each pocket extends from the interior wall of the corresponding D-profile guide shaft hole to the nearest right or left side and adjacent bottom side.

10. The adapter of claim 1, further comprising two or more spacer tools, each spacer tool configured to be inserted adjacent to a shaft collar.

11. The adapter of claim 1, furthering comprising a plurality of mounting holes in a top side of the rear fixed jaw adapter block, a top side of the front floating jaw adapter block, and a top side of the middle floating jaw.

12. The adapter of claim 11, further comprising one or more vise jaw accessories, said one or more vise jaw accessories configured to be attached by one or more of said plurality of mounting holes to the top side of the rear fixed jaw adapter block, the top side of the front floating jaw adapter block, and/or the top side of the middle floating jaw.

13. The adapter of claim 12, wherein the one or more vise jaw accessories comprise gripper strips.

14. The adapter of claim 1, further comprising two or more retaining rings attached at or proximate to the second ends of the D-profile guide shafts.

15. The adapter of claim 1, further comprising two or more retaining rings attached at or proximate to the second ends of the circular guide shafts.

* * * * *